United States Patent
Bathiche et al.

(10) Patent No.: US 9,251,405 B2
(45) Date of Patent: Feb. 2, 2016

(54) SYSTEMS AND METHODS FOR ENHANCEMENT OF FACIAL EXPRESSIONS

(71) Applicant: Elwha LLC, Bellevue, WA (US)

(72) Inventors: Steven Bathiche, Kirkland, WA (US); Alistair K. Chan, Bainbridge Island, WA (US); William David Duncan, Kirkland, WA (US); William Gates, Redmond, WA (US); Roderick A. Hyde, Redmond, WA (US); Edward K. Y. Jung, Las Vegas, NV (US); Jordin T. Kare, Seattle, WA (US); Jaron Lanier, Sausalito, CA (US); John L. Manferdelli, San Francisco, CA (US); Clarence T. Tegreene, Bellevue, WA (US); Charles Whitmer, North Bend, WA (US); Victoria Y. H. Wood, Livermore, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/923,106

(22) Filed: Jun. 20, 2013

(65) Prior Publication Data

US 2014/0376785 A1    Dec. 25, 2014

(51) Int. Cl.
*G06K 9/00* (2006.01)
*H04N 1/393* (2006.01)
*H04N 1/40* (2006.01)

(52) U.S. Cl.
CPC ........ *G06K 9/00302* (2013.01); *G06K 9/00221* (2013.01); *G06K 9/00268* (2013.01); *G06K 9/00335* (2013.01); *H04N 1/3935* (2013.01); *H04N 1/40068* (2013.01)

(58) Field of Classification Search
CPC .......... G06K 9/00302; G06K 9/00268; G06K 9/00221; G06K 9/00335; G06K 9/00362; H04N 1/3935; H04N 1/40068
See application file for complete search history.

(56) References Cited

U.S. PATENT DOCUMENTS

| | | | |
|---|---|---|---|
| 6,606,096 B2 * | 8/2003 | Wang | 345/473 |
| 6,879,709 B2 * | 4/2005 | Tian et al. | 382/118 |
| 7,209,577 B2 | 4/2007 | McAlpine et al. | |
| 7,821,409 B2 | 10/2010 | Ishida | |
| 8,254,691 B2 * | 8/2012 | Kaneda et al. | 382/195 |
| 8,340,727 B2 * | 12/2012 | Melzer | 455/566 |
| 8,396,708 B2 * | 3/2013 | Park et al. | 704/231 |
| 8,488,023 B2 * | 7/2013 | Bacivarov et al. | 348/239 |

(Continued)

FOREIGN PATENT DOCUMENTS

| KR | 2009-0050199 A | 5/2009 |
|---|---|---|
| KR | 10-1198322 B1 | 11/2012 |

OTHER PUBLICATIONS

Automatic emotion recognition software, from YouTube (www.youtube.com/watch?v=45eLpzk6N34&NR=1), uploaded on Oct. 8, 2009, retrieved on Jun. 25, 2013, 2 pages. Facial Expression Recognition, from robotics.nus.edu (http://robotics.nus.edu.sg/projects/79-facial-expression-recognition.html), dated Feb. 19, 2009, retrieved on Aug. 30, 2013, 1 page.
Future Attribute Screening Technology, From Wikipedia, the free encyclopedia (en.wikipedia.org/wiki/Future_Attribute_Screening_Technology), retrieved on Jun. 25, 2013, 4 pages.

(Continued)

*Primary Examiner* — Manav Seth
(74) *Attorney, Agent, or Firm* — Foley & Lardner LLP

(57) ABSTRACT

A system for enhancing a facial expression includes a processing circuit is configured to receive video of a user, generate facial data corresponding to a face of the user, analyze the facial data to identify a facial expression, enhance the facial data based on the facial expression, and output modified video including the enhanced facial data.

32 Claims, 12 Drawing Sheets

(56) References Cited

U.S. PATENT DOCUMENTS

| | | | |
|---|---|---|---|
| 2006/0153430 A1* | 7/2006 | Canzler et al. | 382/118 |
| 2007/0070181 A1* | 3/2007 | Oh et al. | 348/14.02 |
| 2007/0268312 A1* | 11/2007 | Marks et al. | 345/633 |
| 2008/0002892 A1 | 1/2008 | Jelonek et al. | |
| 2008/0068397 A1* | 3/2008 | Carey et al. | 345/619 |
| 2008/0165195 A1* | 7/2008 | Rosenberg | 345/473 |
| 2008/0238694 A1 | 10/2008 | Ishida | |
| 2008/0294014 A1 | 11/2008 | Goodfield | |
| 2010/0079491 A1 | 4/2010 | Nonaka | |
| 2010/0141663 A1 | 6/2010 | Becker et al. | |
| 2010/0166055 A1 | 7/2010 | Schmit et al. | |
| 2012/0242698 A1* | 9/2012 | Haddick et al. | 345/633 |
| 2013/0070973 A1* | 3/2013 | Saito et al. | 382/118 |
| 2013/0191145 A1* | 7/2013 | Nudd et al. | 705/2 |
| 2013/0304587 A1* | 11/2013 | Ralston | 705/14.67 |
| 2014/0003652 A1* | 1/2014 | Fedorovskaya et al. | 382/103 |
| 2014/0050408 A1* | 2/2014 | Balasubramanian et al. | 382/195 |
| 2014/0104440 A1* | 4/2014 | Sampathkumaran et al. | 348/207.1 |
| 2015/0098657 A1* | 4/2015 | Melzer, Roy | 382/195 |
| 2015/0235087 A1* | 8/2015 | Bigioi et al. | 382/103 |

OTHER PUBLICATIONS

Green Dot, from Movement.nyu.edu (http://movement.nyu.edu/GreenDot/?page=about), retrieved on Aug. 30, 2013, 1 page Homeland Security's Big Brother Malintent Program on Fast Track, from Phantoms & Monsters ™ (http://phantomsandmonsters.wetpaint.com/page/Homeland Security%27s Big Brother%27Malintent%27 Program on Fast Track), posted Sep. 24, 2008, retrieved on Aug. 30, 2013, 4 pages.

Real-time facial expression analysis, take 2, from YouTube (www.youtube.com/watch?v=V25qulxpJOc&NR=1&feature=fvwp), uploaded on Nov. 4, 2007, retrieved on Jun. 25, 2013, 2 pages.

Samurai, "Suspicious and abnormal behavior monitoring using a network of cameras & sensors for situation awareness enhancement", Cordis, quality validation date of Mar. 29, 2011, printed on Jun. 25, 2013, 2 pages.

PCT International Search Report; International App. No. PCT/US2014/043216; Oct. 8, 2014; pp. 1-3.

* cited by examiner

SYSTEMS AND METHODS FOR ENHANCEMENT OF FACIAL EXPRESSIONS

BACKGROUND

When engaged in a real-time video communication with another individual, a person may desire to mask, accentuate, or otherwise change the perception of their emotion by the other party or parties. The person may wish to do so without actually altering his or her facial expression, hiding his or her face, or taking other action in order to affect the perception of the emotion by the other party or parties.

SUMMARY

One embodiment relates to a system for enhancing a facial expression, including a processing circuit. The processing circuit is configured to receive video of a user, generate facial data corresponding to a face of the user, analyze the facial data to identify a facial expression, enhance the facial data based on the facial expression, and output modified video including the enhanced facial data.

Another embodiment relates to a method of enhancing a facial expression. The method includes receiving video of a user, generating facial data corresponding to a face of the user, analyzing the facial data to identify a facial expression, enhancing the facial data based on the facial expression, and outputting modified video including the enhanced facial data.

Another embodiment relates to a non-transitory computer-readable medium having instructions stored thereon for execution by a processing circuit. The instructions include instructions for receiving video of the user, instructions for generating facial data corresponding to a face of the user, instructions for analyzing the facial data to identify the facial expression, instructions for enhancing the facial data based on the facial expression, and instructions for outputting modified video including the enhanced facial data.

Another embodiment relates to a system for modifying a facial expression, including a processing circuit. The processing circuit is configured to receive a video of a user, analyze the video to determine a face of the user, analyze the user's face to determine a facial expression, analyze the facial expression to infer an emotion of the user, modify the video based on the emotion, where modifying the video alters the facial expression, and output the modified video.

Another embodiment relates to a method of modifying a facial expression. The method includes receiving video of a user, analyzing the video to determine a face of the user, analyzing the user's face to determine a facial expression, analyzing the facial expression to infer an emotion of the user, modifying the video based on the emotion, where modifying the video alters the facial expression, and outputting the modified video.

Another embodiment relates to a non-transitory computer-readable medium having instructions stored thereon for execution by a processing circuit. The instructions include instructions for receiving video of the user, instructions for analyzing the video to determine a face of the user, instructions for analyzing the user's face to determine the facial expression, instructions for analyzing the facial expression to infer an emotion of the user, instructions for modifying the video based on the emotion, where modifying the video alters the facial expression, and instructions for outputting the modified video.

Another embodiment relates to a system for generating visual information relating to a facial expression, including a processing circuit. The processing circuit is configured to receive a video of a user, analyze the video to determine a face of the user, analyze the user's face to determine a facial expression, analyze the facial expression to infer an emotion of the user, generate visual information based on the inferred emotion, and output the visual information.

Another embodiment relates to a method for generating visual information relating to a facial expression. The method includes receiving video of a user, analyzing the video to determine a face of the user, analyzing the user's face to determine a facial expression, analyzing the facial expression to infer an emotion of the user, generating visual information based on the inferred emotion, and outputting the visual information.

Another embodiment relates to a non-transitory computer-readable medium having instructions stored thereon for execution by a processing circuit. The instructions include instructions for receiving video of the user, instructions for analyzing the video to determine a face of the user, instructions for analyzing the user's face to determine the facial expression, instructions for analyzing the facial expression to infer an emotion of the user, instructions for generating visual information based on the inferred emotion, and instructions for outputting the visual information.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
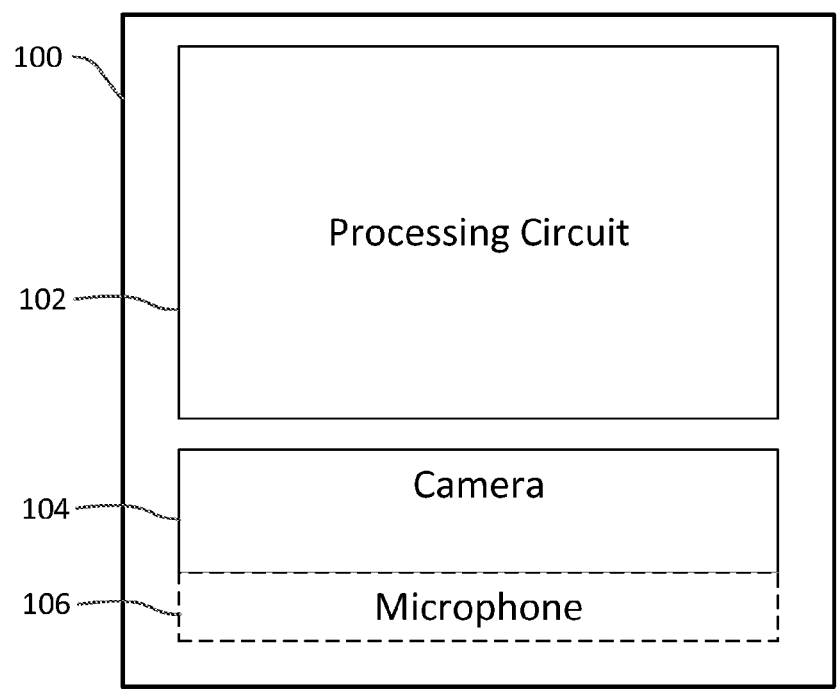
FIG. 1 is a block diagram of a system for altering a facial expression according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments for systems and methods of enhancing and/or modifying a facial expression are shown and described. A camera may be used to capture real-time video of a user during a video communication (e.g., a video chat, video call, video conference, internet-based meeting room, etc.). The user may be using a mobile device, a wearing computing device, computing glasses, a computer, a laptop, a video terminal, or any other computing device that is capable of video communication. The video communication may be with a single viewer, or multiple viewers. During the video communication, the user may desire to alter his emotions as displayed to the viewer. The computing device scans the real-time video input and enhances or alters the video feed prior to being output to the viewer. As used herein, the term enhancing (and the terms enhance, enhancement, etc.) may refer to increasing a resolution, decreasing a resolution, changing a color, adjusting a time response, improving, degrading, blurring, sharpening, embellishing, beautifying, correcting, highlighting, tinting, accentuating, emphasizing, accenting, understating, and the like. In one example, the user may desire to have his emotions accentuated in order to aid the viewer's interpretation of the user's emotions. In this manner, the computing device made utilize excess transmission bandwidth to provide a higher resolution to areas of the user's face indicative of emotions (e.g., the eyes, mouth, etc.). In another example, the user may desire to modify his facial expressions. In this case, the computing device may monitor the video feed for an emotional indicator (e.g., a smile, a frown, etc.), and modify pixels of the video feed corresponding to the emotional indicator. The modification can distort facial regions, adjust coloring, adjust locations of the facial regions, blur pixels, etc., as will be discussed in further detail below. In another example, the user may desire to modify the video feed based on the context of the video communication (e.g., different modifications may be applied for a work-related video conference as compared to an informal video chat with a friend, etc.). In another example, the video feed may be overlaid with visual information to aid with the viewer's interpretation of the user's emotion. The visual information may be automatically generated based on analysis of the video feed in real time. The visual information may include markings or arrows pointing to an emotional indicator of the user's face, textual information describing the emotional indicator, highlights, a separate video portion displaying just the emotional indicator, etc. The systems described herein may be enabled on both a sender and/or receiver's systems, with or without the other party being made aware of the system.

In one embodiment, a user enables a setting such that the computing device enhances emotional indicators of happiness. The computing device increases the resolution of the portion of the transmission corresponding to the facial areas of a smile (e.g., the mouth region). In another embodiment, the user enables a setting such that emotional indicators of sadness are hidden. The computing device distorts or blurs areas of the face indicating sadness (e.g. a frown). In another embodiment, the user enables a setting such that all emotional indicators are deemphasized. The computing device may decrease the transmitted resolution, adjust the time response, or otherwise distort or blur areas of the video feed corresponding to an emotional indicator. In another embodiment, the computing device infers an emotion of the user, and generates visual information corresponding to the emotion. In another embodiment, the computing device receives audio input from a microphone, and uses the audio input to supplement a determination of an emotional indicator and the enhancement or modification of a facial expression.

The described systems herein may be enabled or disabled by a user as the user desires. The user may be a sender or receiver of the video communication. Additionally, a user may specify preferences in order to set characteristics of the enhancements or modifications made to facial expressions. The user may also specify preferences in order to set characteristics of visual information displayed corresponding to the user's facial expressions and emotions. The user preferences and settings may be stored in a preference file. Default operating values may also be provided.

Referring to FIG. 1, a block diagram of device 100 for executing the systems and methods of the present disclosure is shown. According to one embodiment, device 100 includes processing circuit 102, camera 104 for capturing real-time video of the user, and microphone 106 for capturing audio of the user. Camera 104 includes all components necessary for providing a video stream to processing circuit 102. The video stream may be interlaced or progressive, compressed or uncompressed, and of varying frame rates and formats. Microphone 106 includes all components necessary for providing an audio stream to processing circuit 102. Microphone 106 may be part of camera 104, or may be a standalone microphone device. Audio provided by microphone 106 corresponds to the video stream provided by camera 104. Device 100 includes all components necessary to convert analog video and audio streams into digital formats. In alternative embodiments, analog-to-digital conversion components may be part of camera 104 and microphone 106. The scope of the present disclosure is not limited to a particular type of camera or microphone.

In one embodiment, device 100 is a personal computer, camera 104 is a webcam coupled to the USB port of the computer, and microphone 106 is a microphone built into the housing of camera 104. Processing circuit 102 includes the processing components (e.g., processor, memory, etc.) of the personal computer. In one embodiment, device 100 is a laptop computer, camera 104 is a camera built into the laptop's housing, and microphone 106 is a microphone built into the laptop. Processing circuit 102 includes the processing components of the laptop. In one embodiment, device 100 is a tablet computer, camera 104 is a camera built into the tablet, and microphone 106 is a microphone built into the tablet. Processing circuit 102 includes the processing components of the tablet. In one embodiment, device 100 is a mobile device (e.g., a mobile phone), camera 104 is the camera of the mobile device, and microphone 106 is the audio input means of the mobile device. Processing circuit 102 includes the processing components of the mobile device.

In one embodiment, device 100 is a wearable computing device of a user. For example, device 100 may a glasses frame, or glasses, that include a display (e.g., a heads up display, a head mounted display, an LCD, etc.). Processing circuit 102 may be the processing components embedded in the frame. Camera 104 and microphone 106 may be a camera and microphone embedded in the frame. In this manner, the systems described herein may be used to capture real time video from the user's perspective, analyze and edit the real time video stream as discussed herein, and output the edited video stream directly to the display of the glasses. For example, a police officer wearing such glasses may enable the system in order to receive real time-analysis of a person she is speaking with, and to aid her interpretation of emotional indicators and facial expressions of the person.

In one embodiment, device 100 is computing station designed to train actors. For example, device 100 may be personal computer that includes an LCD display. Processing circuit 102 may be the processing components of the personal computer. Camera 104 may be a high-definition camera connected to the personal computer, and microphone 106 may a microphone connected to the computer. The systems described herein may prompt a user to attempt to act out a certain emotion (e.g., to look "happy" or "sad", etc.). Camera 104 may capture video of the user acting out the emotion via the camera, and processing circuit 102 may analyze the captured video and display it on the LCD display. Processing circuit 102 may generate visual information overlaid on the video related to the user's expressions such that the user may utilize the visual information to enhance his or her acting abilities.

Figure 2:
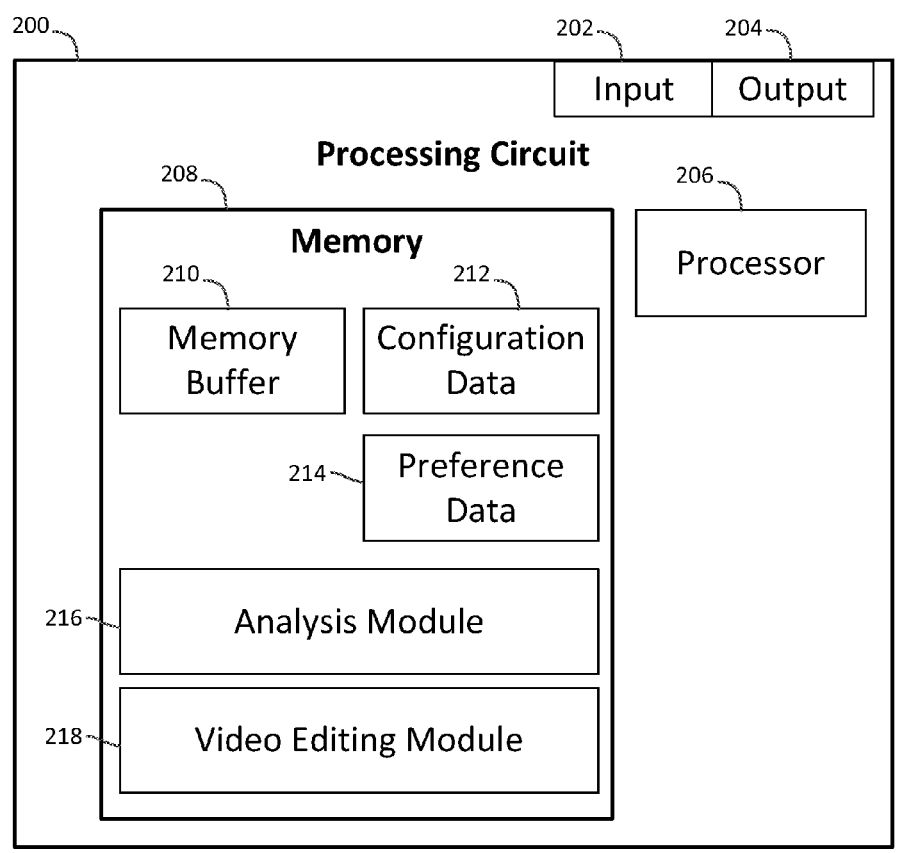
FIG. 2 is a schematic diagram of a processing circuit according to one embodiment.

Referring to FIG. 2, a detailed block diagram of processing circuit 200 for completing the systems and methods of the present disclosure is shown according to one embodiment. Processing circuit 200 may be processing circuit 102 of FIG. 1. Processing circuit 200 is generally configured to accept input from an outside source (e.g., a camera, a microphone, etc.). Processing circuit 200 is further configured to receive configuration and preference data. Input data may be accepted continuously or periodically. Processing circuit 200 uses the input data to analyze a video stream and scan for a user's face. Processing circuit analyzes a detected face and determines facial expression characteristics. Based on the facial expression characteristics, processing circuit 200 enhances, modifies, or adds visual information to the video. Enhancements, modifications, and visual information may each be generated in real time according to a variety of methods (e.g., frame-by-frame, pixel-by-pixel, etc.). Processing circuit 200 outputs the altered video stream and/or the enhancements, modifications, and visual information (e.g., for transmission via the internet or otherwise, etc.). Processing circuit 200 may further identify an emotion or predict a future emotion of the user based on the facial expression characteristics. Processing circuit 200 may use the identified or predicted emotion in altering the video stream. In some embodiments, processing circuit 200 accepts an audio stream in conjunction with the video stream. Processing circuit 200 may analyze the audio stream for emotional indicators and utilize the audio information in altering the video stream.

According to one embodiment, processing circuit 200 includes processor 206. Processor 206 may be implemented as a general-purpose processor, an application specific integrated circuit (ASIC), one or more field programmable gate arrays (FPGAs), a group of processing components, or other suitable electronic processing components. Processing circuit 200 also includes memory 208. Memory 208 is one or more devices (e.g., RAM, ROM, Flash Memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to the processor 206 and include computer code or instructions for executing the processes described herein (e.g., the processes shown in FIGS. 3-11).

Memory 208 includes memory buffer 210. Memory buffer 210 is configured to receive a data stream from a sensor device (e.g. camera 104, microphone 106, etc.) through input 202. For example, the data may include a real-time video stream, a video frame, a group of video frames, pixel information, an audio stream, syncing information related to the video and audio streams, and camera and microphone specification information, etc. The data received through input 202 may be stored in memory buffer 210 until memory buffer 210 is accessed for data by the various modules of memory 208. For example, analysis module 216 and video editing module 218 each can access the data that is stored in memory buffer 210.

Memory 208 further includes configuration data 212. Configuration data 212 includes data relating to processing circuit 200. For example, configuration data 212 may include information relating to interfacing with other components of a device (e.g., device 100 of FIG. 1). This may include the command set needed to interface with graphic display components, for example, a graphics processing unit (GPU) or the display system of a computing device. This may further include the command set need to generate graphical user interface (GUI) controls and visual information. Such a GUI may allow a user to configure and interact with the systems described herein. As another example, configuration data 212 may include the command set needed to interface with networking components (e.g., a wireless network care, an Ethernet card, etc.). In this manner, processing circuit 200 may format video stream data for output via output 204 to allow communication capability with other devices. As an example, video editing module 218 may access configuration data 212 in order to format an audio/video transmission according to a particular communication protocols (e.g., internet protocol (IP), transmission control protocol (TCP), server-client protocols, a peer-to-peer protocol, etc.). As another example, configuration data 212 may include information as to how often input should be accepted from a camera or microphone of the device. As another example, configuration data 212 may include default values required to initiate communication with peripheral components (e.g., cameras, microphones, etc.) Configuration data 212 further includes data to configure communication between the various components of processing circuit 200.

Processing circuit 200 further includes input 202 and output 204. Input 202 is configured to receive a data stream, configuration information, and preference information. Output 204 is configured to provide an output to a networking component, a graphical component, or other components of a computing device as described herein.

Memory 208 further includes modules 216 and 218 for executing the systems and methods described herein. Modules 216 and 218 are configured to receive video stream data, audio stream data, configuration information, user preference data, and other data as provided by processing circuit 200. Modules 216 and 218 are generally configured to analyze the data, determine facial expression characteristics of the user, and determine whether to enhance the video stream data, modify the video stream data, or generate visual information related to video stream data. Modules 216 and 218 may be further configured to operate according to a user's preferences. In this manner, certain enhancements, modifications, and visual information may be generated or bypassed according to a user's desires.

Analysis module 216 is configured to receive video stream data from a camera and audio stream data from a microphone (e.g., camera 104, microphone 106, etc.). The video and audio data may be provided through input 202 or through memory buffer 210. The video and audio data may also be provided from a remote video and audio source (e.g., from another computer over the internet, etc.). Analysis module 216 scans video data and analyzes the data. Analysis module 216 determines the locations of a user's facial features. This may include locations, dimensions, proportions, spacing, etc., of the user's eyes, mouth, cheeks, etc. In one embodiment, analysis module 216 constructs a facial profile corresponding to the user. In another embodiment, analysis module 216 accesses a previously constructed profile. Video and facial data may be compared to standard pre-stored profiles of average users in initially determining features of a particular user. In determining a user feature profile, analysis module 216 may make use of machine learning, artificial intelligence, interactions with databases and database table lookups, pattern recognition and logging, intelligent control, neural networks, fuzzy logic, etc. In this manner, analysis module 216 may store and update user profiles. Analysis module 216 provides facial data, emotion data, and instructions to video editing module 218, which uses the facial data to enhance, modify, or generate visual information based on the facial data and instructions. In one embodiment, analysis module 216 generates audio information based on any of its analysis as discussed herein. For example, audio information may be based on inferred, detected, or predicted emotions/facial expressions. Audio information may include data related to voice (e.g., voice descriptions of emotions or analysis, etc.) or non-voice audio tones, and such audio information may be output.

In one embodiment, analysis module 216 scans video data for facial expression indicative of emotions. This may include, for example, a smile, a frown, a furrowed eyebrow, etc. Analysis module 216 generates characteristic data related to the facial expression (e.g., color information, location information, pixel information, etc.). In determining facial expressions, analysis module 216 may access stored information relating to general facial expression characteristics. Analysis module 216 provides the generated facial characteristic data to video editing module 218, which uses the facial characteristic data to enhance or modify the video stream prior to being output.

In one embodiment, analysis module 216 scans video data for a facial expression indicative of an emotion and compares the facial expression to a previous value. In one embodiment, the previous value relates to a previous facial expression. For example, analysis module 216 may compare a user's smiling mouth to a previously stored expression. In another example, analysis module 216 may compare a user's eyes to baseline eye characteristics. Editing or enhancements of the source video stream as performed by video editing module 218 (as discussed in further detail herein) may be triggered by a result such a comparison, or by a similarity or difference between the facial expression and previously stored value/expression. Baseline feature characteristics may be stored in configuration data 212 or preference data 214. In one embodiment, baseline and previous facial characteristics for a user may be set during a training mode. In this manner, processing circuit 200 may generate GUI commands for a user to make faces corresponding to a prompted emotion. For example, this may include requesting a user to smile in order to create a user profile for a happy emotion, or requesting a user to look serious or sad, etc. During the training mode, analysis module 216 may access the current emotion being trained, and update a database (or other storage means) of facial characteristics for the user profile. Analysis module 216 may tag or otherwise link certain facial characteristics with certain emotions. Analysis module 216 provides the facial characteristic data to video editing module 218, which uses the facial characteristic based on the comparison enhance or modify the video stream prior to being output. In one embodiment, analysis module 216 only provides facial characteristic data to video editing module 218 if the comparison exceeds a certain threshold. The threshold may relate to a percentage change of a facial expression as compared to a previous facial expression, or a digression from an average set of values for a facial expression, etc. In this manner, enhancement or modification of the video stream, or the generation of visual information may be triggered by the comparison to the previous values.

In one embodiment, analysis module 216 scans video data for facial expressions indicative of emotions and provides facial characteristic data to video editing module 218 based on the emotions. Analysis module 216 may identify or predict an emotion corresponding to a facial expression. For example, analysis module 216 may determine that a user is smiling and is therefore feeling happy. Analysis module 216 may then determine that the user's smile should be enhanced. In another example, analysis module 216 may determine that a user looks serious, and may therefore enhance the areas around the user's eyes. In another example, analysis module 216 may determine an emotion by comparing it to a database of emotional characteristics.

In one embodiment, analysis module 216 scans video data for facial expressions indicative of untruthfulness or deception (e.g., lying) and provides facial characteristic data to video editing module 218 based on the emotions. Facial expressions or features indicative of untruthfulness or deception may be based on a particular user or on general expression or feature data (e.g., as stored in a database or configuration data 212, etc.). In this embodiment, analysis module 216 may also scan the video data for movements or actions that are common when a person is not telling the truth. For example, during a video call, analysis module 216, residing on the receiver's system, may detect an increased blinking rate, or a repeated twitching of the mouth, etc. In response, analysis module 216 may determine that the video sender is not being truthful, and generate data used to alert the receiver. As another example, analysis module 216 may analyze a detected smile to determine if it appears to be a "forced" or "polite smile," in which typically only the muscles directly around the mouth are active, as opposed to a "natural" smile where the entire face takes part. As another example, may detect that a user is repeatedly looking away from the camera. The scope of the present application is not limited to particular types of lie/deception detection, and various profiles and configurations may be used to detect a deceptive user. If analysis module 216 determines that a user is lying, it may provide details regarding the lie detection to video editing module 218. Details may include text to be displayed such that a user (sender or receiver) is alerted of the lie. Details may include audio to be output such that a user (sender or receiver) is alerted of the lie. Details may also include information based on the analysis performed and how the lie determination was made.

In one embodiment, analysis module 216 accepts an input of an audio stream. The audio stream corresponds to audio produced in conjunction with the video stream, and may be provided by a microphone or other audio input device. Analysis module 216 analyzes the audio stream in real time for emotional indicators. Analysis module 216 uses the analyzed audio stream to supplement the determination of an emotion as discussed above. For example, if analysis module 216 detects a periodic spike in volume, or an audio pattern that resembles laughter, during the same time period that analysis module 216 also detects a smile, then analysis module 216 may determine with increased accuracy that the user is feeling happy or humorous. In another example, if analysis module 216 detects a pattern of elevated volume during the same time period that analysis module 216 detects furrowed eyebrows and a frowning mouth, analysis module 216 may then determine with increased accuracy that the user is feeling angry. The scope of the present application is not limited to particular audio or video patterns.

Video editing module 218 is generally configured to receive facial data, emotion data, and instructions from analysis module 216. Video editing module 218 accesses the received data, and enhances the source video stream, modifies the source video stream, or generates visual information related to emotions detected in the source video stream. An action of video editing module 218 may be triggered by an operation (e.g., emotions detected, emotions predicted, analysis, etc.) of analysis module 216. Video editing module 218 may perform these operations in real-time compared to reception of the source video stream, and the altered video and/or visual information is output via output 204. The altered video stream may be transmitted to a supplier of the source video, a recipient viewer or multiple recipient viewers (e.g., during a video chat, a video conference call, etc.). The altered video stream may also be directly output to a display (e.g., in the case where the processing circuit discussed herein is part of the system of the recipient). Video editing module 218 may utilize any number of video and image editing algorithms. For example, the algorithms may include algorithms for shifting the locations of pixels, algorithms for applying blur effects (e.g., a Gaussian blur, lens blur, etc.), algorithms for applying sharpening effects, algorithms for warping or otherwise distorting pixels, algorithms for highlighting or selecting boundaries of facial expressions, etc. Video editing module 218 may edit an individual pixel of a video frame or a group of pixels. Video editing module 218 may alter the color values of an individual pixel or a group of pixels. Video editing module 218 may apply various enhancements and modifications for different regions of the face. For example, a user's smile may be enhanced more than a user's eyes. In another example, a user's eyes may be modified while the user's mouth is left unaltered.

In one embodiment, video editing module 218 enhances the pixels of a facial expression. Video editing module 218 accesses the facial data received from analysis module 216, determines pixels corresponding to a facial expression, and enhances the facial expression pixels. For example, an enhancement may include sharpening the pixels of the facial expression. As another example, enhancement may include increasing the resolution throughput of the pixels of the facial expression. Video editing module 218 may utilize excess bandwidth to provide a higher quality (e.g., uncompressed, slightly compressed, etc.) output of pixels corresponding to the facial expression. Video editing module 218 may also enhance a facial expression in order to highlight or show the difference between the facial expression and a baseline (or previously stored) facial expression.

In one embodiment, video editing module 218 modifies the pixels of a facial expression. In contrast to an enhancement as described herein, a modification of facial expression more drastically changes the output facial expression. For example, a facial expression may be reduced in size. As another example, a facial expression may be rotated or changed in orientation. As another example, a facial expression may be increased in size. In another example a facial expression may be morphed with a previously captured facial expression for the user. As another example, a facial expression may be blurred out. As another example, a facial expression may have its coloring altered. As another example, a previously captured facial expression may replace the current facial expression. Video editing module 218 may also modify areas of a facial expression based on a comparison to a baseline (or previously stored) facial expression.

In one embodiment, video editing module 218 generates visual information relating to a facial expression. The visual information may be based on an emotion as determined or predicted by analysis module 216. Generation of the visual information may be triggered by an emotion as determined or predicted by analysis module 216. The generated visual information may be overlaid on the video stream, or output as a separate stream. In one embodiment, the generated visual information is combined with the source video to form a composite video stream, and the composite video stream may be output. Video editing module may replace the appropriate pixels of the video steam with pixels necessary to display the visual indicator. The visual information may aid in a viewer's assessment of the emotions associated with the facial expression. In one embodiment, the visual information includes a textual description relating to the emotion of a facial expression. For example, the textual description may generally list information related to the emotion (e.g., "the user is feeling happy," "smile detected," etc.) As another example, the textual description may note the differences/similarities in the emotion of the current facial expression as compared to the emotion of a previous facial expression. As another example, in an embodiment configured to analyze video to detect a lying user, the textual descriptions may note when the user has been determined to be deceptive. As another example, processing circuit 200 may be configured to operate according to a training mode, and may generate a prompt for a user to act out a certain emotion. Such a prompt may include a specific facial expression that the user should attempt to reproduce. The textual description may note characteristics related to the acted emotion as analyzed by analysis module 216. This configuration may be useful for an actor or actress who is practicing their acting skills. In another embodiment, video editing module 218 generates visual information that includes markings that indicate areas of the face likely to be indicative of emotions. For example, video editing module 218 may generate an arrow pointing to the user's mouth or eyes while the user is displaying a facial expression (e.g., a smile, frown, etc.). In another embodiment, the visual information includes highlights overlaid over a particular area of the user's face. For example, video editing module 218 may generate a yellow circle highlighting a user's eyes if analysis module 216 determines the user is indicating an emotion of surprise. In one embodiment, the visual information includes a portion of the source video stream. For example, video editing module 218 may output a separate video stream of the user's mouth when analysis module 216 determines the user is smiling. In this manner, the separate video stream may be viewed or displayed separately from the source video stream (e.g., in a separate window of the graphical user interface, etc.). Any of the generated visual information discussed herein may be output at a different resolution, magnification, color settings, etc., than the source video stream.

In one embodiment, video editing module 218 generates enhancements, modifications, and visual information according to user settings stored in preference data 214. A user may specify maximum and minimum amounts of modification or enhancement to be applied to a video stream. For example, this may include a range varying from a large amount of distortion applied to a facial expression, to a minimal amount of enhancement applied to a facial expression. A user may further specify particular types of enhancements, modifications, and visual information that are allowed and disallowed.

In one embodiment, the systems described herein is configured to always be enabled during video communications.

In this embodiment, analysis module 216 automatically scans video data for facial expression indicative of emotions as described above, and provides generated facial characteristic data to video editing module 218, which, upon detection of a target emotion or facial expression is triggered to use the facial characteristic data to enhance or modify the video stream prior to being output. Such enhancements and modifications may be further based on pre-stored values related to emotional expressions. In one embodiment, the values are based on emotional indicators corresponding to average people. In another embodiment, the values are based on "ideal" or "correct" emotional indicators. For example, video editing module 218 may be configured to always modify a smile detected in video stream to look like an "ideal" smile. As another example, video editing module 218 may be configured to always modify a frown detected in video stream to lessen the impact of the frown.

In one embodiment, video editing module 218 generates enhancements, modifications, and visual information based on a condition of the communication. Conditions include the type of recipients, number of recipients, nature of the conversations, time of day, etc. For example, during a video chat with a user's family member, video editing module 218 may modify the video stream, but during a video call with a work colleague, video editing module may pass the video stream through unmodified, or perform minimal enhancements. A user may specify the conditions, including nature and type of a communication and recipients through a graphical user interface.

It should be understood, that any of the enhancements, modifications, or visual information discussed herein may be combined and generated separately or at the same time. For example, an output video stream may be both enhanced and include visual information. As another example, an output video stream may be both modified and include visual information. As another example, an output video stream may include an enhancement, a modified portion, and visual information.

Figure 3:
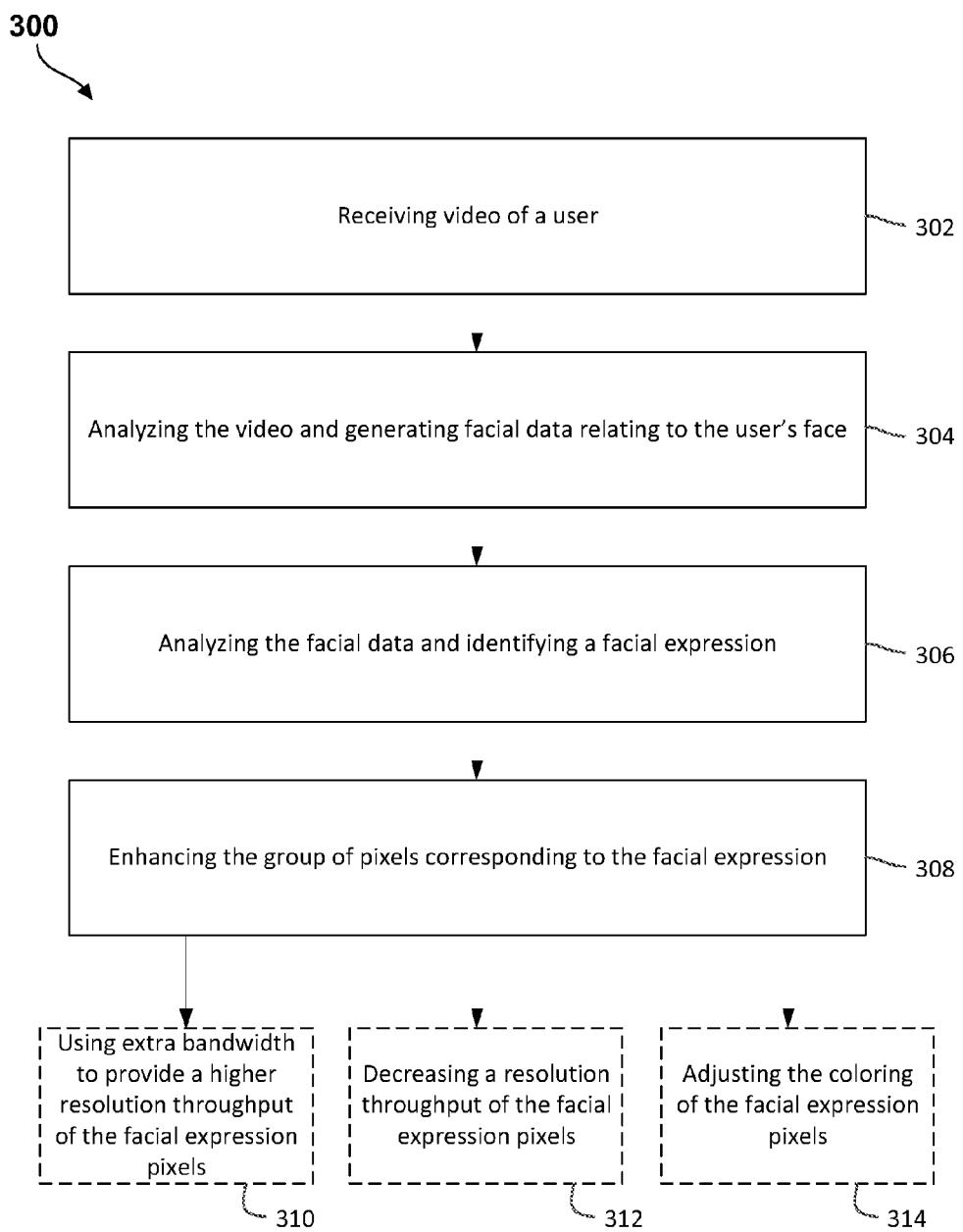
FIG. 3 is a flowchart of a process for enhancing a facial expression according to one embodiment.

Referring to FIG. 3, a flow diagram of a process 300 for enhancing the display of a facial expression, is shown, according to one embodiment. In alternative embodiments, fewer, additional, and/or different steps may be performed. Also, the use of a flow diagram is not meant to be limiting with respect to the order of steps performed. Process 300 includes receiving video of a user (step 302), analyzing the video and generating facial data relating to the user's face (step 304), analyzing the facial data and identifying a facial expression (step 306), and enhancing the group of pixels corresponding to the facial expression (step 308). Enhancements may include, but are not limited to, using extra bandwidth to provide a higher resolution throughput of the facial expression pixels (step 310), decreasing a resolution throughput of the facial expression pixels (step 312), or adjusting the coloring of the facial expression pixels (step 314).

Figure 4:
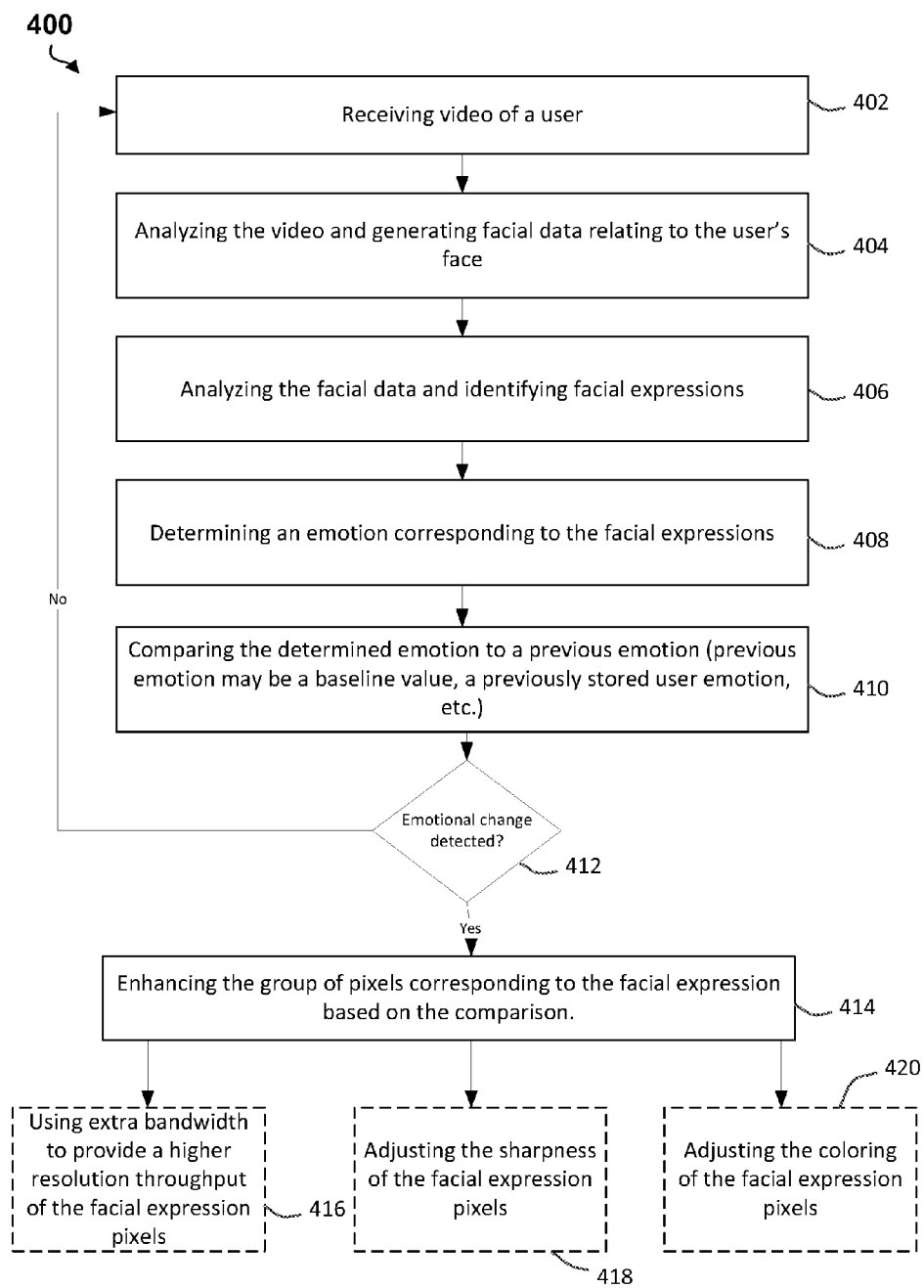
FIG. 4 is a flowchart of a process for enhancing a facial expression according to one embodiment.

Referring to FIG. 4, a flow diagram of a process 400 for enhancing the display of a facial expression, is shown, according to one embodiment. In alternative embodiments, fewer, additional, and/or different steps may be performed. Also, the use of a flow diagram is not meant to be limiting with respect to the order of steps performed. Process 400 includes receiving video of a user (step 402), analyzing the video and generating facial data relating to the user's face (step 404), analyzing the facial data and identifying facial expressions (step 406), determining an emotion corresponding to the facial expressions (step 408), and comparing the determined emotion to a previous emotion (the previous emotion may be a baseline value, a previously stored user emotion, etc.) (step 410). If an emotional change is detected (step 412), then enhance the group of pixels corresponding to the facial expression based on the comparison (step 414). Enhancements may include, but are not limited to, using extra bandwidth to provide a higher resolution throughput of the facial expression pixels (step 416), adjusting the sharpness of the facial expression pixels (step 418), or adjusting the coloring of the facial expression pixels (step 420).

Figure 5:
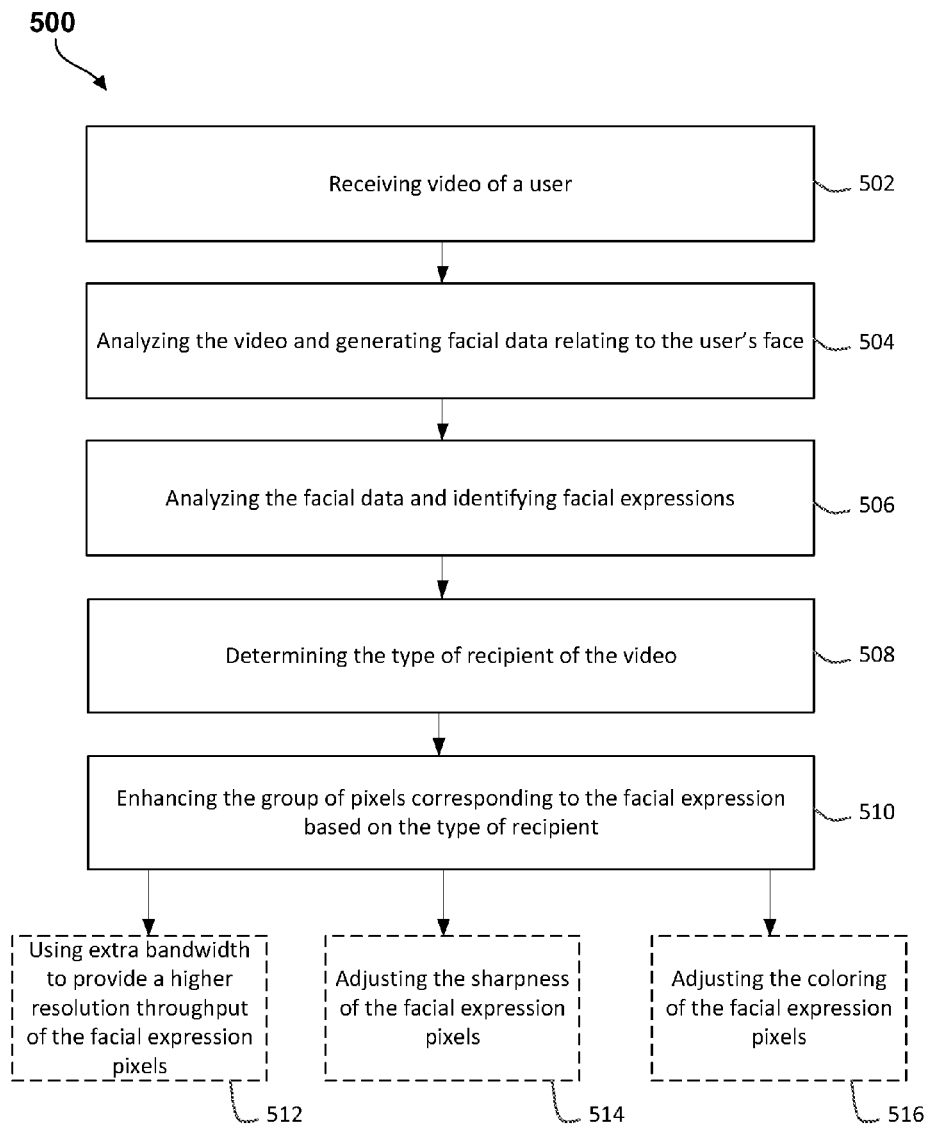
FIG. 5 is a flowchart of a process for enhancing a facial expression according to one embodiment.

Referring to FIG. 5, a flow diagram of a process 500 for enhancing the display of a facial expression, is shown, according to one embodiment. In alternative embodiments, fewer, additional, and/or different steps may be performed. Also, the use of a flow diagram is not meant to be limiting with respect to the order of steps performed. Process 500 includes receiving video of a user (step 502), analyzing the video and generating facial data relating to the user's face (step 504), analyzing the facial data and identifying facial expressions (step 506), determining the type of recipient of the video (step 508), and enhancing the group of pixels corresponding to the facial expression based on the type of recipient (step 510). Enhancements may include, but are not limited to, using extra bandwidth to provide a higher resolution throughput of the facial expression pixels (step 512), adjusting the sharpness of the facial expression pixels (step 514), or adjusting the coloring of the facial expression pixels (step 516).

Figure 6:
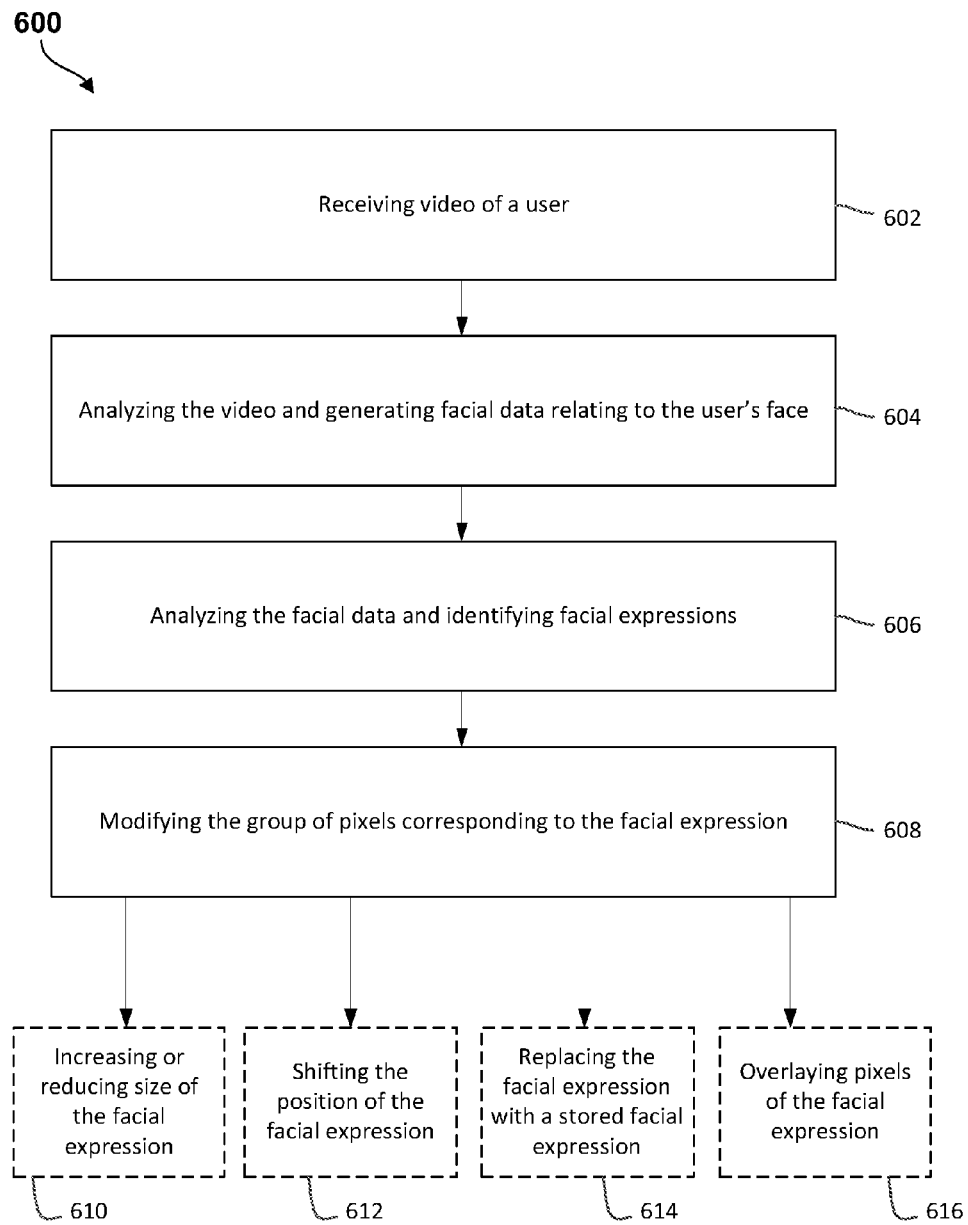
FIG. 6 is a flowchart of a process for modifying a facial expression according to one embodiment.

Referring to FIG. 6, a flow diagram of a process 600 for modifying the display of a facial expression, is shown, according to one embodiment. In alternative embodiments, fewer, additional, and/or different steps may be performed. Also, the use of a flow diagram is not meant to be limiting with respect to the order of steps performed. Process 600 includes receiving video of a user (step 602), analyzing the video and generating facial data relating to the user's face (step 604), analyzing the facial data and identifying facial expressions (step 606), and modifying the group of pixels corresponding to the facial expression (step 608). Modifications may include, but are not limited to, increasing or reducing size of the facial expression (step 610), shifting the position of the facial expression (step 612), replacing the facial expression with a stored facial expression (step 614), and overlaying pixels of the facial expression (step 616).

Figure 7:
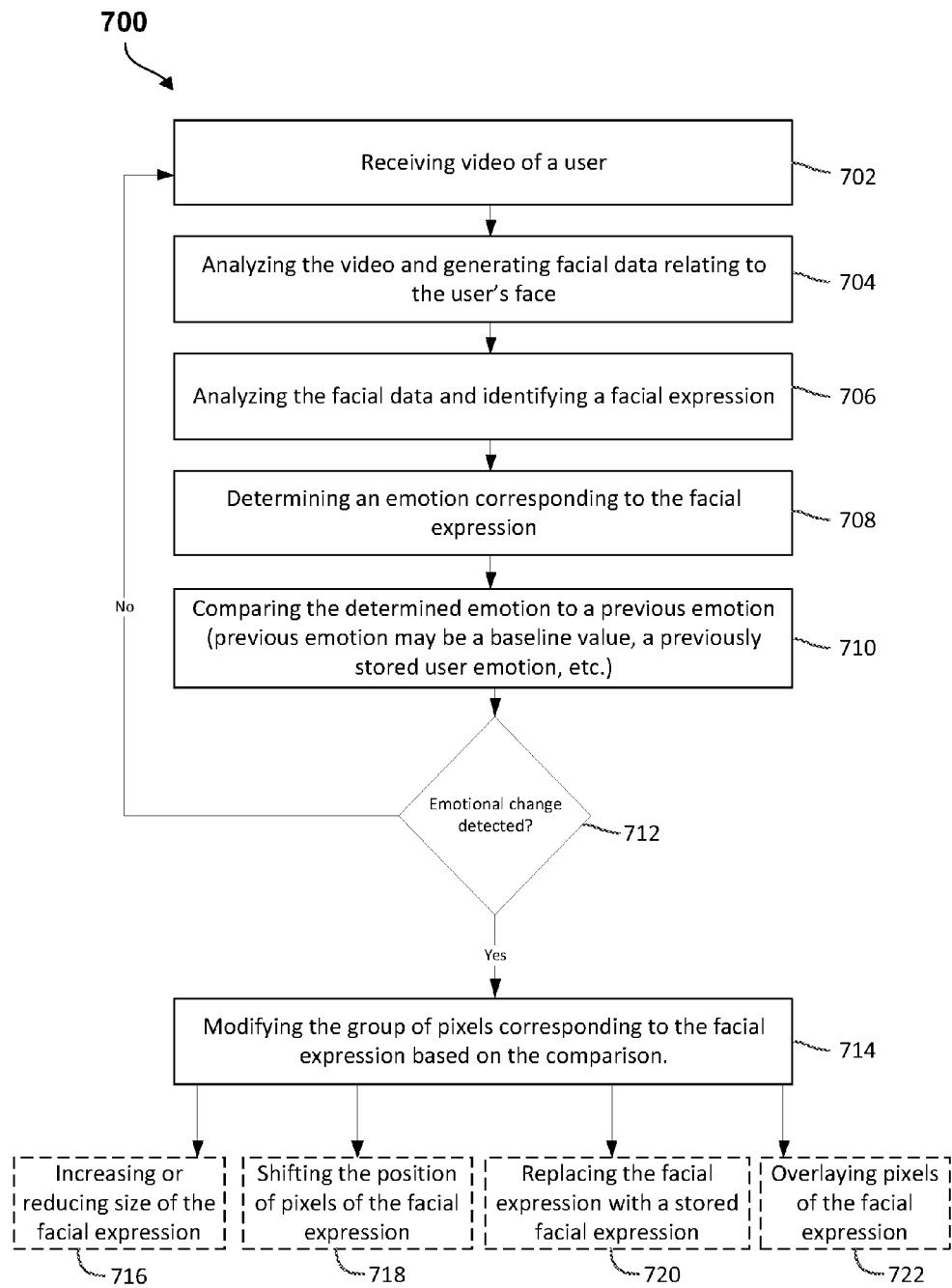
FIG. 7 is a flowchart of a process for modifying a facial expression according to one embodiment.

Referring to FIG. 7, a flow diagram of a process 700 for modifying the display of a facial expression, is shown, according to one embodiment. In alternative embodiments, fewer, additional, and/or different steps may be performed. Also, the use of a flow diagram is not meant to be limiting with respect to the order of steps performed. Process 700 includes receiving video of a user (step 702), analyzing the video and generating facial data relating to the user's face (step 704), analyzing the facial data and identifying facial expressions (step 706), determining an emotion corresponding to the facial expression (step 708), and comparing the determined emotion to a previous emotion (previous emotion may be a baseline value, a previously stored user emotion, etc.) (step 710). If an emotional change is detected (step 712), then modify the group of pixels corresponding to the facial expression based on the comparison (step 714). Modifications may include, but are not limited to, increasing or reducing size of the facial expression (step 716), shifting the position of pixels of the facial expression (step 718), replacing the facial expression with a stored facial expression (step 720), and overlaying pixels of the facial expression (step 722).

Figure 8:
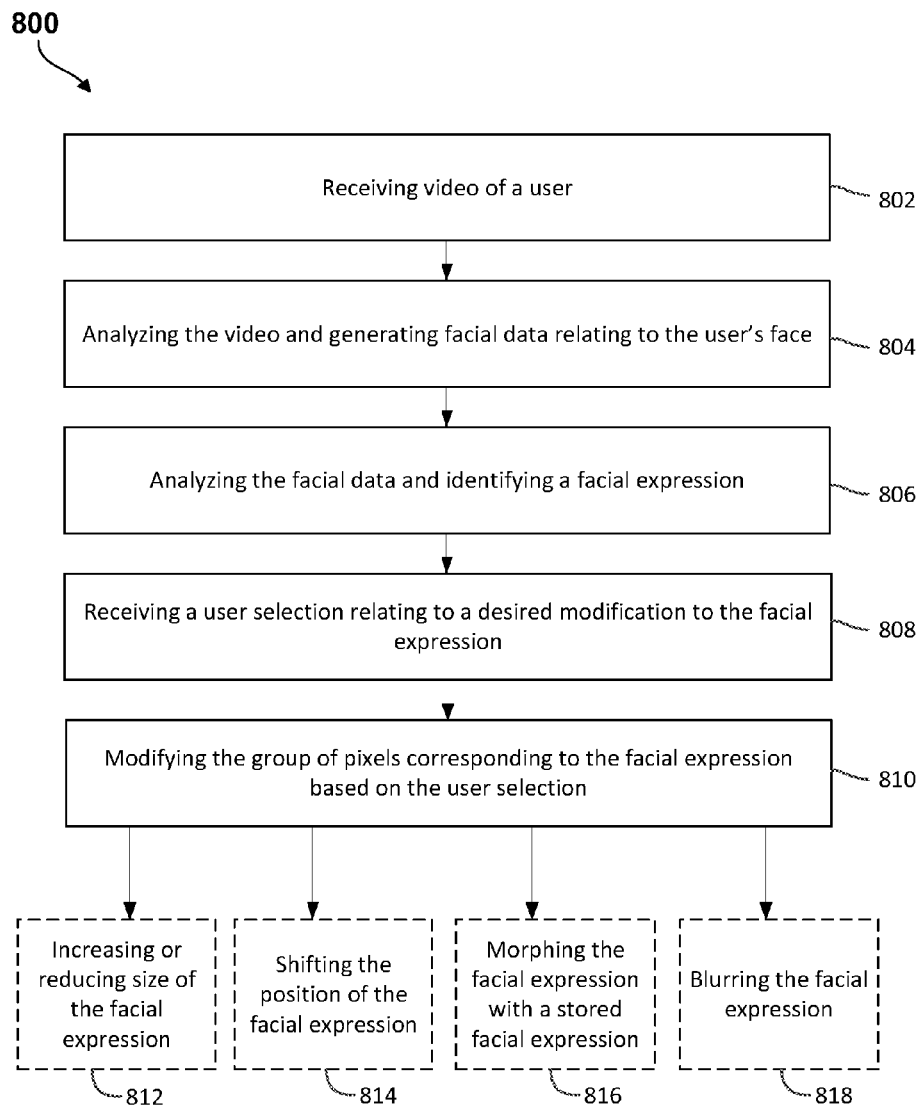
FIG. 8 is a flowchart of a process for modifying a facial expression according to one embodiment.

Referring to FIG. 8, a flow diagram of a process 800 for modifying the display of a facial expression, is shown, according to one embodiment. In alternative embodiments, fewer, additional, and/or different steps may be performed.

Also, the use of a flow diagram is not meant to be limiting with respect to the order of steps performed. Process 800 includes receiving video of a user (step 802), analyzing the video and generating facial data relating to the user's face (step 804), analyzing the facial data and identifying a facial expression (step 806), receiving a user selection relating to a desired modification to the facial expression (step 808), and modifying the group of pixels corresponding to the facial expression based on the user selection (step 810). Modifications may include, but are not limited to, increasing or reducing size of the facial expression (step 812), shifting the position of the facial expression (step 814), morphing the facial expression with a stored facial expression (step 816), and blurring the facial expression (step 818).

Figure 9:
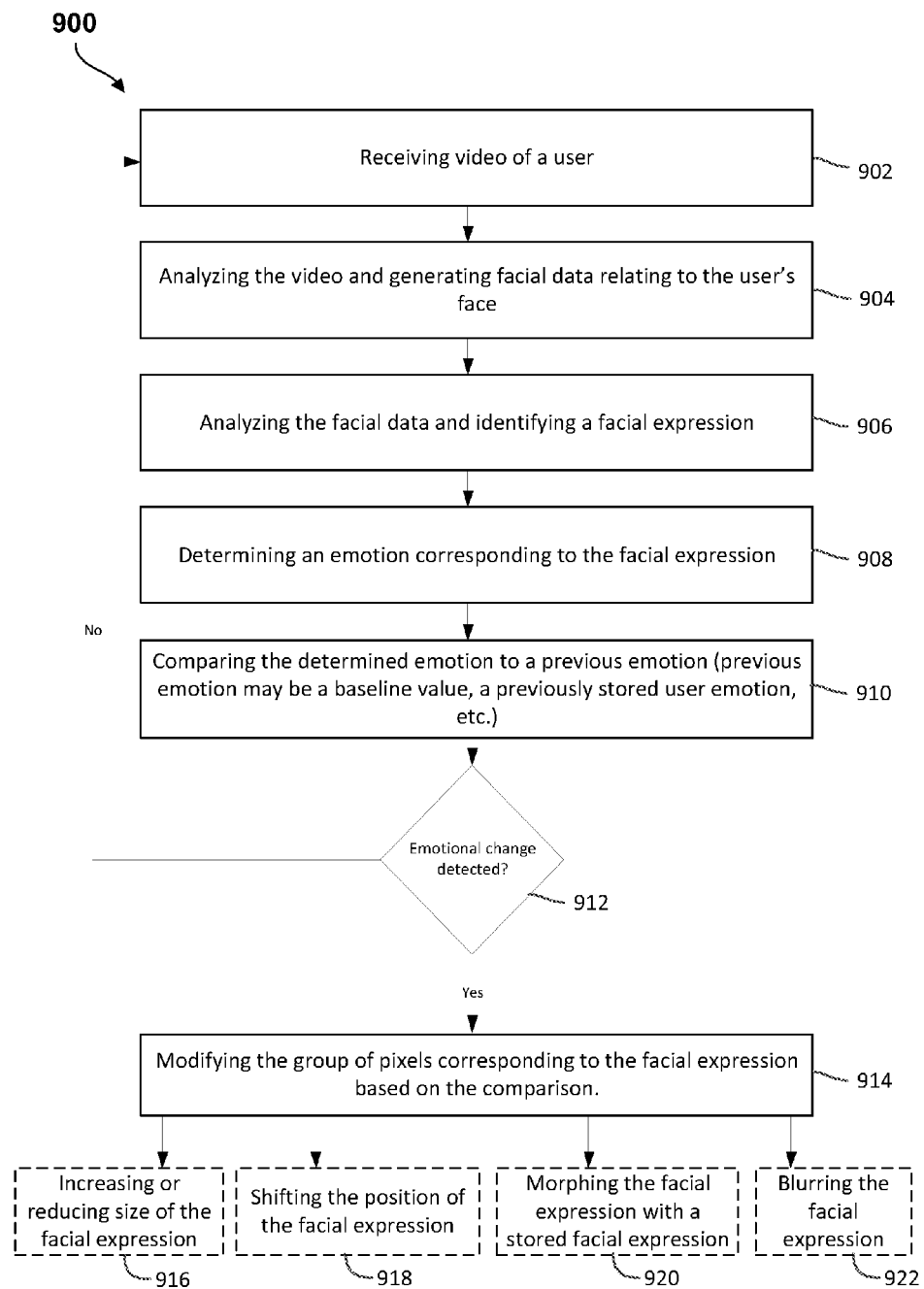
FIG. 9 is a flowchart of a process for modifying a facial expression according to one embodiment.

Referring to FIG. 9, a flow diagram of a process 900 for modifying the display of a facial expression, is shown, according to one embodiment. In alternative embodiments, fewer, additional, and/or different steps may be performed. Also, the use of a flow diagram is not meant to be limiting with respect to the order of steps performed. Process 900 includes receiving video of a user (step 902), analyzing the video and generating facial data relating to the user's face (step 904), analyzing the facial data and identifying a facial expression (step 906), determining an emotion corresponding to the facial expression (step 908), and comparing the determined emotion to a previous emotion (previous emotion may be a baseline value, a previously stored user emotion, etc.) (step 910). If an emotional change is detected (step 912), then modify the group of pixels corresponding to the facial expression based on the comparison (step 914). Modifications may include, but are not limited to, increasing or reducing size of the facial expression (step 916), shifting the position of the facial expression (step 918), morphing the facial expression with a stored facial expression (step 920), and blurring the facial expression (step 922).

Figure 10:
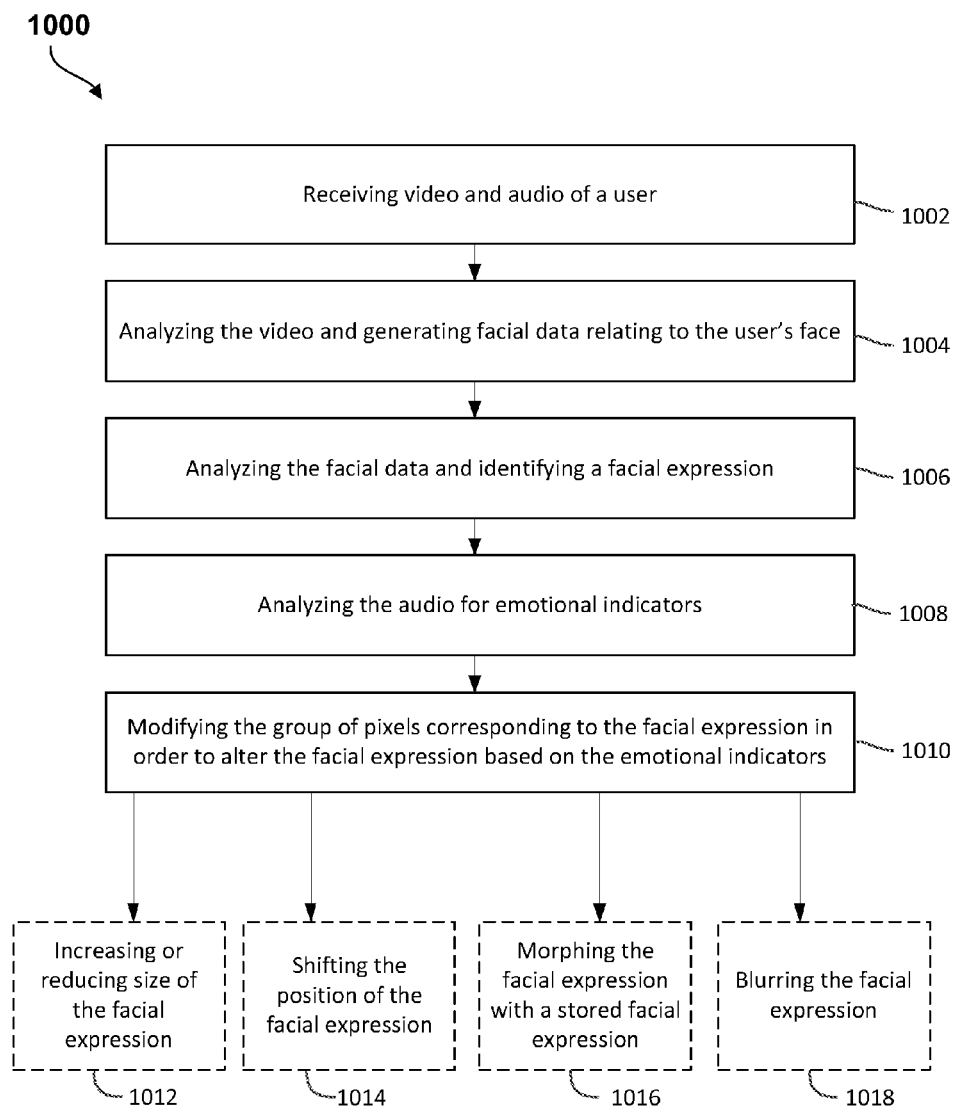
FIG. 10 is a flowchart of a process for modifying a facial expression according to one embodiment.

Referring to FIG. 10, a flow diagram of a process 1000 for modifying the display of a facial expression, is shown, according to one embodiment. In alternative embodiments, fewer, additional, and/or different steps may be performed. Also, the use of a flow diagram is not meant to be limiting with respect to the order of steps performed. Process 1000 includes receiving video and audio of a user (step 1002), analyzing the video and generating facial data relating to the user's face (step 1004), analyzing the facial data and identifying a facial expression (step 1006), analyzing the audio for emotional indicators (step 1008), and modifying the group of pixels corresponding to the facial expression in order to alter the facial expression based on the emotional indicators (step 1010). Modifications may include, but are not limited to, increasing or reducing size of the facial expression (step 1012), shifting the position of the facial expression (step 1014), morphing the facial expression with a stored facial expression (step 1016), and blurring the facial expression (step 1018).

Figure 11:
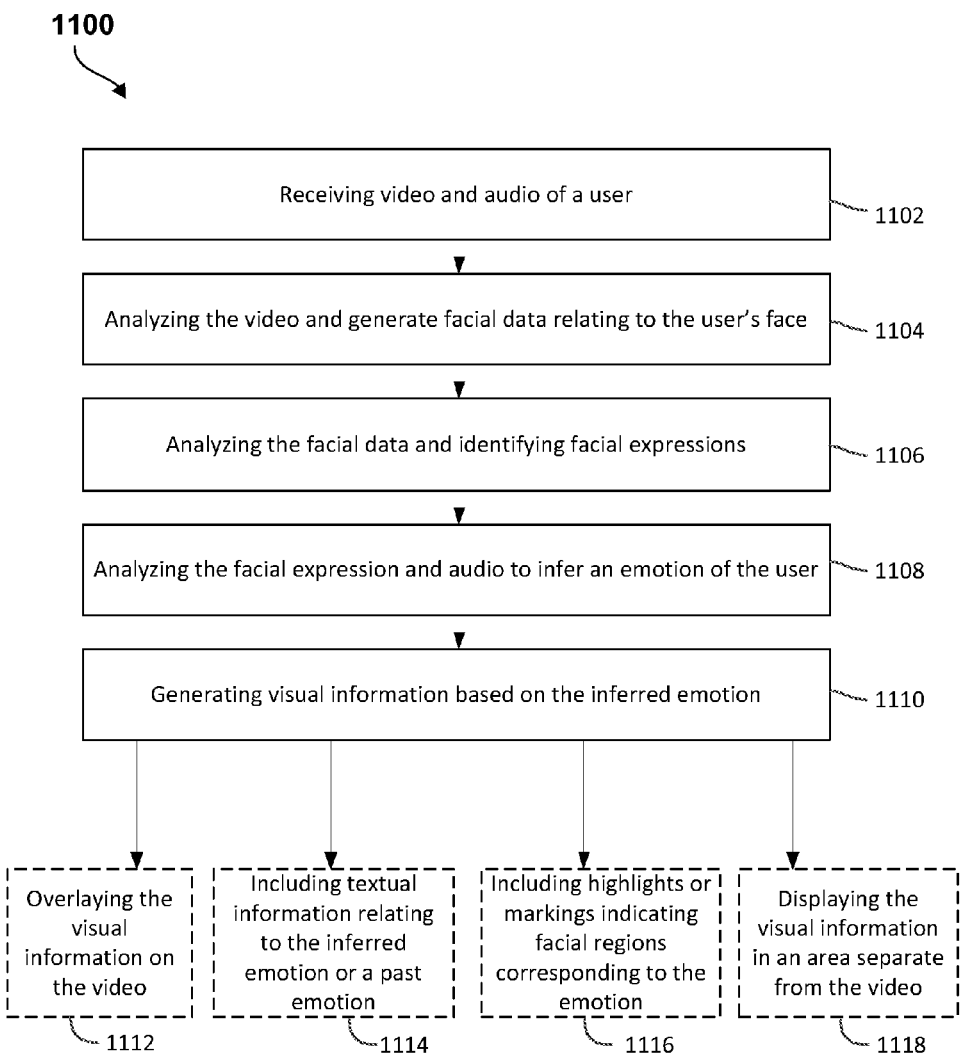
FIG. 11 is a flowchart of a process for generating visual information corresponding to a facial expression according to one embodiment.

Referring to FIG. 11, a flow diagram of a process 1100 for displaying visual information corresponding to a facial expression, is shown, according to one embodiment. In alternative embodiments, fewer, additional, and/or different steps may be performed. Also, the use of a flow diagram is not meant to be limiting with respect to the order of steps performed. Process 1100 includes receiving video and audio of a user (step 1102), analyzing the video and generate facial data relating to the user's face (step 1104), analyzing the facial data and identifying facial expressions (step 1106), analyzing the facial expression and audio to infer an emotion of the user (step 1108), and generating visual information based on the inferred emotion (step 1110). The visual information may include, but is not limited to, overlaid visual information on the video (step 1112), textual information relating to the inferred emotion or a past emotion (step 1114), highlights or markings indicating facial regions corresponding to the emotion (step 1116), and displaying the visual information in an area separate from the video (step 1118).

Figure 12:
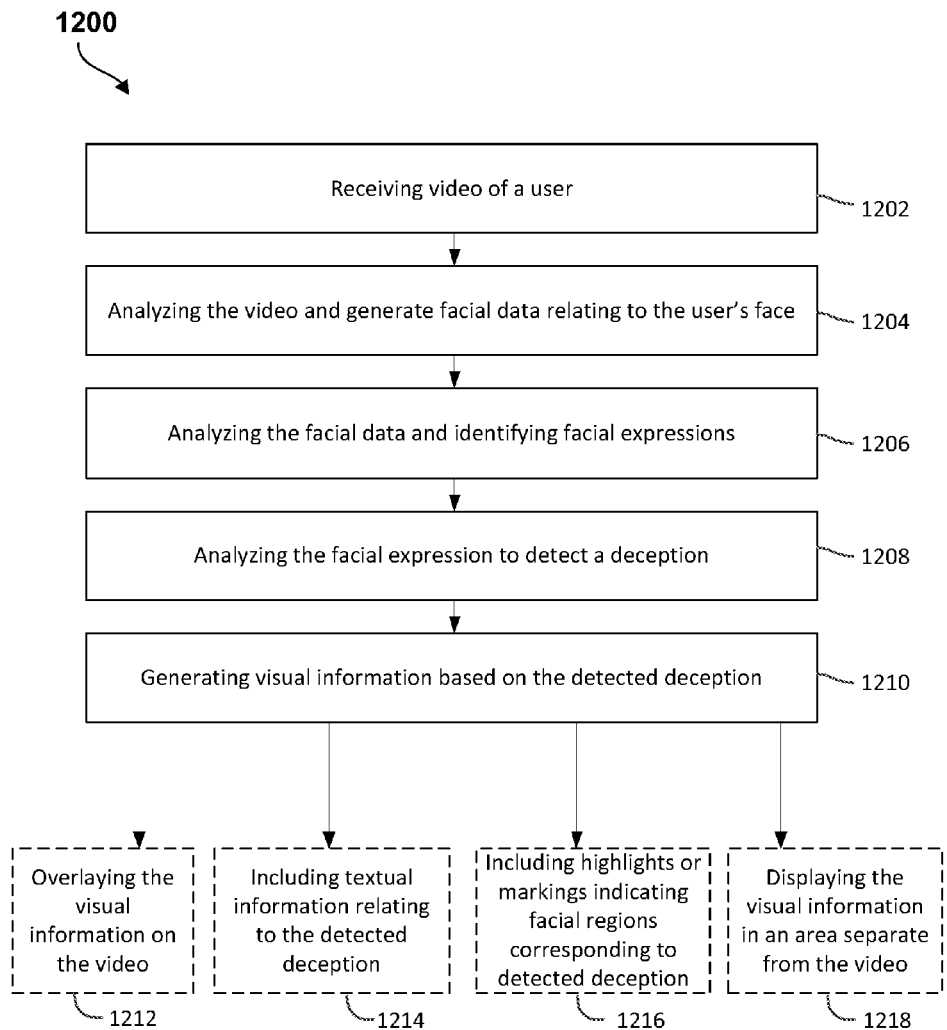
FIG. 12 is a flowchart of a process for generating visual information corresponding to a facial expression according to one embodiment.

Referring to FIG. 12, a flow diagram of a process 1200 for displaying visual information corresponding to a facial expression, is shown, according to one embodiment. In alternative embodiments, fewer, additional, and/or different steps may be performed. Also, the use of a flow diagram is not meant to be limiting with respect to the order of steps performed. Process 1200 includes receiving video of a user (step 1202), analyzing the video and generate facial data relating to the user's face (step 1204), analyzing the facial data and identifying facial expressions (step 1206), analyzing the facial expression to detect deception (step 1208), and generating visual information based on the detected deception (step 1210). The visual information may include, but is not limited to, overlaid visual information on the video (step 1212), textual information relating to the detected deception (step 1214), highlights or markings indicating facial regions corresponding to the detected deception (step 1216), and displaying the visual information in an area separate from the video (step 1218).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for enhancing a facial expression, comprising:
a processing circuit configured to:
receive video of a user;
generate facial data corresponding to a face of the user;
analyze the facial data to identify a facial expression, wherein identifying the facial expression includes comparing the face of the user to a previously stored user facial expression;
enhance the facial data based on the facial expression, wherein enhancing the facial data comprises adjusting an image resolution corresponding to areas of the video having the facial expression, wherein adjusting the image resolution includes modifying at least one pixel of a frame of the video that corresponds to the facial expression, and wherein enhancing the facial data is triggered by a similarity of the facial expression to the previously stored user facial expression; and
output the modified video including the enhanced facial data.

2. The system of claim 1, wherein the modified video is output in real-time compared to reception of the video.

3. The system of claim 1, wherein enhancing the facial data includes adjusting a color of the facial expression.

4. The system of claim 1, wherein the previously stored user facial expression includes a baseline facial expression set by the user during a training mode.

5. The system of claim 1, wherein enhancing the facial data is based on a moving average of the facial expression and the previously stored user facial expression.

6. The system of claim 1, wherein the enhancement applied to the facial data is selected based on a recipient of the output video, and wherein the output video for a first recipient includes enhanced facial data different than enhanced facial data included in the output video for a second recipient.

7. The system of claim 1, wherein enhancing the facial data is based on a condition, and wherein the condition includes at least one of a type of recipient of the output video, a time of day, a number of recipients of the output video and a location of a recipient of the output video.

8. The system of claim 1, wherein analyzing the facial data includes generating emotion data based on an indicated emotion of the facial expression, and wherein enhancing the facial data is based on the emotion data.

9. The system of claim 1, wherein the processing circuit is further configured to predict a future emotion corresponding to the user based on the facial data, and wherein enhancing the facial data is based on the predicted emotion.

10. The system of claim 1, further comprising a microphone configured to capture audio of the user, and wherein the processing circuit is further configured to:
receive the audio; and
analyze the audio for indications of an emotion of the user, wherein enhancing the facial data is based on the analyzed audio.

11. The system of claim 1, wherein the processing circuit is the processing circuit of a wearable computing device having a head mounted display.

12. A system for modifying a facial expression, comprising:
a processing circuit configured to:
receive a video of a user;
analyze the video to determine a face of the user;
analyze the user's face to determine a facial expression;
analyze the facial expression to infer an emotion of the user, wherein inferring the emotion of the user includes comparing the face of the user to a previously stored user facial expression;
determine a type of recipient to receive a modified video;
modify the video based on the emotion and a condition, wherein the condition comprises the determined type of recipient and a nature of a conversation, wherein modifying the video alters the facial expression, and wherein modifying the video is triggered by a result of the comparison; and
output the modified video.

13. The system of claim 12, wherein the modified video is output in real-time compared to reception of the video.

14. The system of claim 12, wherein modifying the video includes enhancing or degrading the facial expression.

15. The system of claim 12, wherein modifying the video includes at least one of reducing a size of the facial expression, enlarging a size of the facial expression, shifting a position of the facial expression, and overlaying data on the facial expression.

16. The system of claim 12, wherein modifying the video includes replacing the facial expression with a second facial expression.

17. The system of claim 12, wherein modifying the video includes morphing the facial expression with a second facial expression.

18. The system of claim 12, wherein the modification applied to the video is selected based on a recipient of the modified video, and wherein the modified video output to a first recipient includes a facial expression different than a facial expression included in the modified video output a second recipient.

19. The system of claim 12, wherein the condition further comprises at least one of a time of day, a number of recipients of the modified video output, and a location of a recipient of the modified video output.

20. The system of claim 12, further comprising a microphone configured to capture audio of the user, and wherein the processing circuit is further configured to:

receive the audio; and
analyze the audio for indications of an emotion of the user, wherein modifying the video is based on the analyzed audio.

21. The system of claim 12, wherein the processing circuit is the processing circuit of a wearable computing device having a head mounted display, and wherein the wearable computing device includes glasses.

22. A system for generating visual information relating to a facial expression, comprising:
a processing circuit configured to:
receive a video of a user;
analyze the video to determine a face of the user;
analyze the user's face to determine a facial expression;
analyze the facial expression to infer an emotion of the user, wherein inferring the emotion of the user includes comparing the face of the user to a previously stored user facial expression;
generate visual information based on the inferred emotion, wherein the visual information includes a portion of the video, wherein the visual information is at an image resolution different from the video, and wherein generating the visual information is triggered by a result of the comparison; and
output a separate video including the visual information.

23. The system of claim 22, wherein the visual information is output to a supplier of the video.

24. The system of claim 22, wherein the visual information is combined with the video to form a composite video, and wherein outputting the visual information comprises outputting the composite video.

25. The system of claim 22, wherein the processing circuit is further configured to:
generate audio information based on the inferred emotion; and
output the audio information.

26. The system of claim 22, wherein analyzing the facial expression includes determining whether the user is lying by scanning the facial expression for features indicative of deception, and wherein the visual information further includes information related to a determined lie.

27. The system of claim 22, wherein the visual information includes textual information relating to the emotion or relating to a previous emotion of the user.

28. The system of claim 22, wherein the visual information is at a different color setting or a different magnification.

29. The system of claim 22, wherein the visual information is generated in real-time.

30. The system of claim 22, wherein the generated visual information is selected based on a recipient of the video, and wherein the visual information output to a first recipient is different than the visual information output a second recipient.

31. The system of claim 22, wherein the processing circuit is further configured to:
prompt the user to act out an emotion; and
prompt the user to make a facial expression.

32. The system of claim 22, wherein the processing circuit is the processing circuit of a wearable computing device having a head mounted display.

* * * * *